United States Patent
Nemoto et al.

(10) Patent No.: US 12,005,646 B2
(45) Date of Patent: Jun. 11, 2024

(54) CLEANING METHOD, CLEANING DEVICE, CLEANING AGENT, AND PRELIMINARY CLEANING AGENT

(71) Applicant: KEIYO CHEMICAL CO., LTD., Chiba (JP)

(72) Inventors: Tatsuhiro Nemoto, Chiba (JP); Yutaka Kondoh, Chiba (JP)

(73) Assignee: RAISER MOON, INC., Shiroi (JP)

( * ) Notice: Subject to any disclaimer, the term of this patent is extended or adjusted under 35 U.S.C. 154(b) by 76 days.

(21) Appl. No.: 17/612,574

(22) PCT Filed: May 21, 2020

(86) PCT No.: PCT/JP2020/020171
§ 371 (c)(1),
(2) Date: Nov. 19, 2021

(87) PCT Pub. No.: WO2020/235650
PCT Pub. Date: Nov. 26, 2020

(65) Prior Publication Data
US 2023/0127712 A1    Apr. 27, 2023

(30) Foreign Application Priority Data

May 22, 2019   (JP) .................................. 2019-096413
Jan. 22, 2020  (JP) .................................. 2020-008138

(51) Int. Cl.
*B29C 64/35*    (2017.01)
*B08B 3/08*     (2006.01)
(Continued)

(52) U.S. Cl.
CPC ................ *B29C 64/35* (2017.08); *B08B 3/08* (2013.01); *B08B 3/106* (2013.01); *B08B 13/00* (2013.01);
(Continued)

(58) Field of Classification Search
None
See application file for complete search history.

(56) References Cited

U.S. PATENT DOCUMENTS 5,503,785 A      4/1996   Crump et al.
2019/0048294 A1* 2/2019   Hori .................... C11D 11/0029

FOREIGN PATENT DOCUMENTS

JP    2004255839 A    9/2004
JP    200535299 A     2/2005
(Continued)

OTHER PUBLICATIONS

Google Patents translation of JP 4540195B2 (Year: 2023).*
International Search Report in PCT/JP2020/020171, dated Jul. 14, 2020. 7pp.
(Continued)

*Primary Examiner* — Eric W Golightly
(74) *Attorney, Agent, or Firm* — HAUPTMAN HAM, LLP (57) ABSTRACT

A hydrophobic preliminary cleaning agent includes a first compound and a second compound, The first compound is fatty acid ester and the second compound is any one of solid paraffin, hydroxylated wax, and aliphatic alcohol having 1 to 24 carbon atoms.
The second compound is greater than or equal to 30 weight % with respect to 100 weight % by total weight of the first compound and the second compound, The hydrophobic preliminary cleaning agent is solidified at room temperature.

8 Claims, 6 Drawing Sheets

(51) Int. Cl.
  *B08B 3/10*  (2006.01)
  *B08B 13/00*  (2006.01)
  *B22F 10/68*  (2021.01)
  *B22F 12/10*  (2021.01)
  *B29C 64/295*  (2017.01)
  *B29C 64/40*  (2017.01)
  *B33Y 40/20*  (2020.01)
  *C23G 5/036*  (2006.01)

(52) U.S. Cl.
  CPC .............. *B22F 10/68* (2021.01); *B22F 12/10* (2021.01); *B29C 64/295* (2017.08); *B29C 64/40* (2017.08); *B33Y 40/20* (2020.01); *C23G 5/036* (2013.01); *B08B 2203/007* (2013.01)

(56) References Cited

FOREIGN PATENT DOCUMENTS

| | | | |
|---|---|---|---|
| JP | 4540195 | B2 * | 9/2010 |
| JP | 201296428 | A | 5/2012 |
| JP | 201883869 | A | 5/2018 |
| JP | 201989323 | A | 6/2019 |
| JP | 202075410 | A | 5/2020 |
| WO | 0168375 | A2 | 9/2001 |
| WO | 2018222395 | A1 | 12/2018 |

OTHER PUBLICATIONS

Tatsuhiro Nemoto, "Extripper, a New 3D Printer Cleaning Technology, Was Born", Japan Plastics, 2018, vol. 69, No. 10, pp. 52-55 and cover pp. 53. 14pp.

Written Opinion in PCT/JP2020/020171, dated Jul. 14, 2020, 11pp.

* cited by examiner

CLEANING METHOD, CLEANING DEVICE, CLEANING AGENT, AND PRELIMINARY CLEANING AGENT

CROSS-REFERENCE TO RELATED APPLICATIONS

The present application is a National Phase of International Application No. PCT/JP2020/020171 filed May 21, 2020, which claims the benefit of priority from the prior Japanese patent applications No. 2019-096413 filed on May 22, 2019, and No. 2020-008138 filed on Jan. 22, 2020, the entire contents of which are incorporated herein by reference.

TECHNICAL FIELD

The present invention relates to a cleaning method, a cleaning device, a cleaning agent, and a preliminary cleaning agent.

BACKGROUND ART

Three-dimensional modeling is a technology in which a desired tridimensional modeled object is obtained on the basis of three-dimensional shape data by fusing or curing a thermoplastic resin, a photo-curable resin, a powder resin, a powder metal, or the like with melting extrusion or inkjet, laser light or an electron beam, and the like to be stacked into the shape of a thin film. Since the modeled object is obtained directly from the shape data, and an intricate shape such as a hollow shape or a mesh shape can be integrally molded, the field of application has been expanded to the medical field, the aircraft industry, the industrial robot, and the like, including the preparation of a test model in which small-lot production or custom-made production is required.

In order to obtain the tridimensional modeled object, a three-dimensional modeling device referred to as a 3D printer has been generally used. Specifically, an inkjet ultraviolet curing type 3D printer using an acrylic photo-curable ink, such as Objet (Registered Trademark) manufactured by Stratasys, Ltd. and AGILISTA (Registered Trademark) manufactured by KEYENCE CORPORATION, a fused deposition modeling type 3D printer using an acrylonitrile.butadiene.styrene resin, a polycarbonate resin, a polyphenyl sulfone resin, a polyether imide resin, or the like, such as FORTUS, Dimension, and uPrint, manufactured by Stratasys, Ltd., a powder modeling type 3D printer such as SLS manufactured by 3D Systems Corporation, an optical modeling type 3D printer such as SLA manufactured by 3D Systems Corporation and DigitalWax manufactured by Digital Wax Systems S.R.L., and the like have been known.

In the three-dimensional modeling, the tridimensional modeled object having an intricate shape can be formed, but in order to produce a hollow structure or the like, a structure body for supporting a shape is required to temporarily support the resin during the modeling on a bottom portion of the tridimensional modeled object and to prevent the tridimensional modeled object from being deformed by the own weight. In the case of the powder modeling type 3D printer that binds or fuses a powder raw material, the unbound or unfused powder acts as a support body to support a structural object, and thus, the tridimensional modeled object can be obtained by brushing off the excess powder after the production. In addition, even in the optical modeling type 3D printer that gradually cures a photosensitive resin with laser light or the like, the uncured photosensitive resin supports a structure body, and thus, the support body can be removed by only pulling up the tridimensional modeled object from a photosensitive resin tank. On the other hand, in the case of performing three-dimensional modeling of a fused deposition modeling method or an inkjet method, which has been widely used, the tridimensional modeled object containing a model material and the support body containing a support material are simultaneously formed, and thus, it is necessary to provide a step of removing the support material after the formation.

However, in the case of performing the three-dimensional modeling of the fused deposition modeling method or the inkjet method, removing the support material is not a simple operation at all. Since the support material is fused, or adheres or pressure-sensitively adheres to the model material, in an operation of peeling the support material from the model material, the support material is manually peeled off by generally using a spatula, a brush, or the like, or means such as blowing off the support material with a waterjet is used, but there is a risk such as the damage of the tridimensional modeled object, and thus, a careful operation is required, which becomes a heavy burden.

Therefore, a separation method such as heating, dissolution, a chemical reaction, dynamic cleaning such as hydraulic cleaning, electromagnetic irradiation, and a thermal expansion difference is proposed in accordance with the properties of the support material, in which a material that is soluble in water or an organic solvent, a thermoplastic resin, a water-swellable gel, and the like are used as the support material (Patent Documents 1 and 2). Specifically, it is proposed that the removal of the support material is simplified by using a resin that is easily peeled off from the model material (Patent Documents 3 and 4) or by using wax in the support material to be melted and removed with heat (Patent Document 5).

CITATION LIST

Patent Document

Patent Document 1: JP 2005-035299 A
Patent Document 2: JP 2012-096428 A
Patent Document 3: U.S. Pat. No. 5,503,785
Patent Document 4: WO 2001-068375 A
Patent Document 5: JP 2004-255839 A

SUMMARY OF THE INVENTION

Problem to be Solved by the Invention

However, even in the case of using the support material that is easily peeled off from the model material, it is extremely difficult to efficiently remove the support material clogged in a fine structure or a hollow portion. In particular, a time required for removing increases as the model material is in an intricate form. In addition, in the case of using the method of melting and removing the support material with heat, there is a concern that the model material is deformed as the degree of heating with respect to the model material increases. Therefore, it is also necessary to perform melting and removing while suppressing thermal deformation. In addition, in the case of performing coating in the subsequent step (for example, in a case where the tridimensional modeled object is a figure), the remaining oil content (the support material or the like) causes a coating defect.

As described above, in the three-dimensional modeling, a cleaning method of a support material has been desired to be established in which the model material to which the support material is attached can be cleaned, and an operation time is short.

Means for Solving Problem

The most important feature of the invention is that a cleaning agent of an object to which a hydrophobic high-molecular compound is attached has fluidity in a range of higher than or equal to a melting point of the high-molecular compound and lower than a melting point of the object, soluble in water, and contains a solvent, and a surfactant acting on the high-molecular compound.

It is preferable that the object contains a model material that is molded by a 3D printer, and the high-molecular compound contains a support material of the 3D printer. It is preferable that the solvent includes at least one of water and alcohol, the surfactant includes at least one of an anionic surfactant, a cationic surfactant, a nonionic surfactant, an amphoteric surfactant, a compound having an amino group and a hydrophilic group excluding an amino group, and ethanol amines, the hydrophilic group excluding an amino group includes at least one of a hydroxy group, a carboxy group, a carbonyl group, and a sulfo group, a concentration of the surfactant is greater than or equal to 1 weight % and less than or equal to 40 weight %, and the high-molecular compound includes aliphatic alcohol having 1 to 24 carbon atoms or stearyl alcohol.

The feature of the invention is that a preliminary cleaning agent to be in contact with an object to which a hydrophobic high-molecular compound is attached, prior to a cleaning agent, has fluidity in a range of higher than or equal to a melting point of the high-molecular compound and lower than a melting point of the object, and contains a first compound having compatibility with respect to the high-molecular compound, or the first compound and a second compound.

It is preferable that the first compound is fatty acid ester. It is preferable that the second compound is solid paraffin.

The feature of the invention is that a cleaning device of an object to which a high-molecular compound is attached includes a cleaning container containing the cleaning agent, a cleaning agent temperature adjustment unit adjusting a temperature of the cleaning agent contained in the cleaning container, a rinsing container containing a rinsing liquid having compatibility with respect to the cleaning agent, a rinsing liquid temperature adjustment unit adjusting a temperature of the rinsing liquid contained in the rinsing container, and a controller controlling each of the units, in the cleaning container, the object is in contact with the cleaning agent, in the rinsing container, the object is in contact with the rinsing liquid, and the controller sets the temperature of the cleaning agent to be higher than or equal to a melting point of the high-molecular compound and lower than a melting point of the object, and the temperature of the rinsing liquid to be higher than or equal to the melting point of the high-molecular compound and lower than the melting point of the object.

It is preferable that the cleaning device further includes a preliminary cleaning container containing a preliminary cleaning agent, and a preliminary cleaning agent temperature adjustment unit adjusting a temperature of the preliminary cleaning agent contained in the preliminary cleaning container, in the preliminary cleaning container, the object is capable of being in contact with the preliminary cleaning agent, and the controller sets the temperature of the preliminary cleaning agent to be higher than or equal to the melting point of the high-molecular compound and lower than the melting point of the object.

It is preferable that the cleaning device further includes a sealing unit sealing at least one of the preliminary cleaning container, the cleaning container, and the rinsing container, and a cleaning side decompression unit capable of reducing a pressure in the container sealed by the sealing unit. In addition, it is preferable that the controller sets at least one of the preliminary cleaning liquid contained in the preliminary cleaning container, the cleaning liquid contained in the cleaning container, and the rinsing liquid contained in the rinsing container to be in a boiling state.

The feature of the invention is that a cleaning method of an object to which a high-molecular compound is attached includes a cleaning step of bringing the cleaning agent into contact with the object, and a rinsing step of rinsing the object by using a rinsing liquid having compatibility with respect to the cleaning agent, after the cleaning step, a temperature of the cleaning agent is higher than or equal to a melting point of the high-molecular compound and lower than a melting point of the object, and a temperature of the rinsing liquid is higher than or equal to the melting point of the high-molecular compound and lower than the melting point of the object.

It is preferable that the cleaning method further includes a preliminary cleaning step of bringing the preliminary cleaning agent into contact with the object to which the high-molecular compound is attached, before the cleaning step, a temperature of the preliminary cleaning agent is higher than or equal to the melting point of the high-molecular compound and lower than the melting point of the object, and the preliminary cleaning agent contains a compound having compatibility with respect to the high-molecular compound.

It is preferable that at least one of the preliminary cleaning step, the cleaning step, and the rinsing step is performed in an environment lower than an atmospheric pressure. It is preferable that at least one of the preliminary cleaning agent of the preliminary cleaning step, the cleaning agent of the cleaning step, and the rinsing liquid of the rinsing step is in a boiling state.

Effect of the Invention

According to the invention, it is possible to provide a cleaning method in which an object to which a high-molecular compound is attached can be sufficiently cleaned, and a cleaning operation time is short. Further, according to the invention, it is possible to provide a preliminary cleaning agent, a cleaning agent, and a cleaning device to be used in the cleaning method.

MODE(S) FOR CARRYING OUT THE INVENTION

Figure 1:
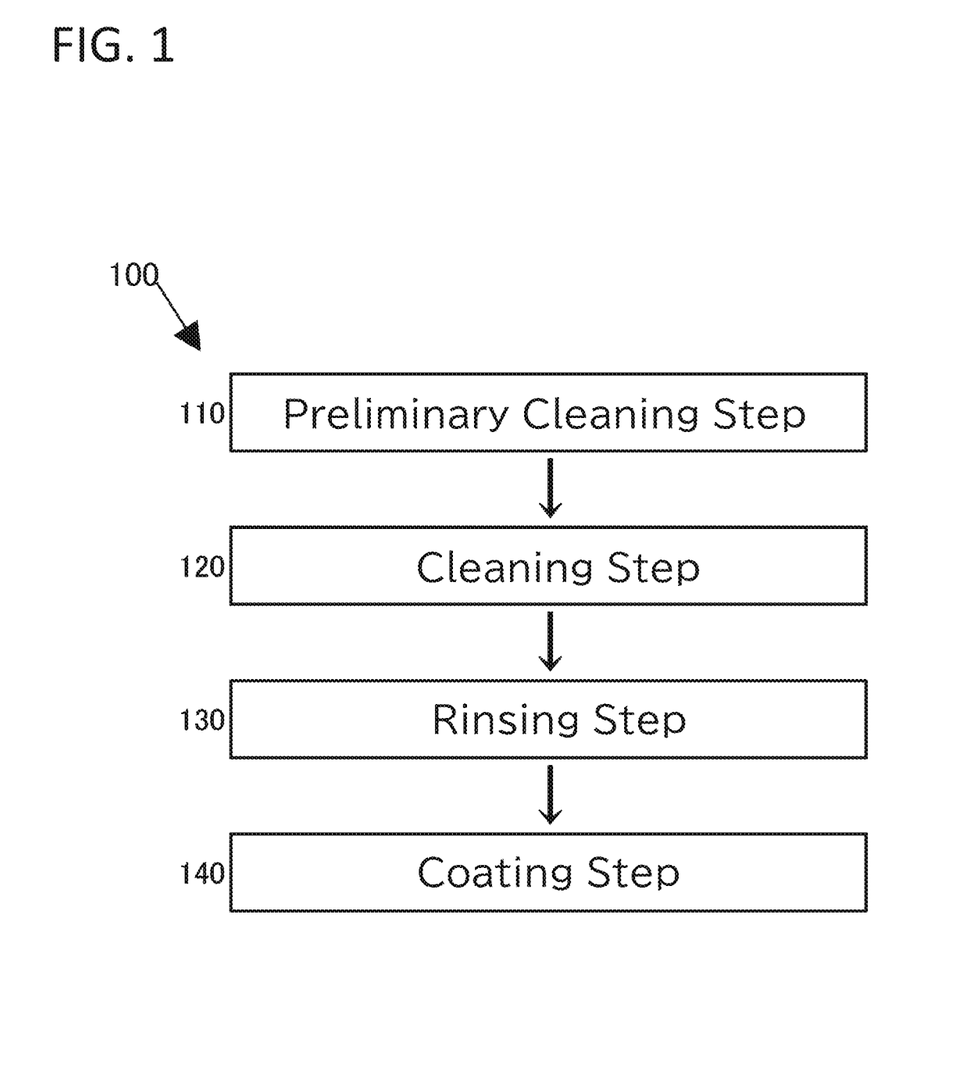
FIG. 1 is a flowchart illustrating an outline of a cleaning method.

As illustrated in FIG. 1, a cleaning method 100 is for removing a support material SP (a high-molecular compound) from a model material MD (an object) to which the support material SP is attached, and includes a preliminary cleaning step 110 of dipping the model material MD to which the support material SP is attached in a preliminary cleaning agent LQ1, a cleaning step 120 of dipping the model material MD to which the support material SP is attached in a cleaning agent LQ2, after the preliminary cleaning step 110, and a rinsing step 130 of dipping the model material MD in water (a rinsing liquid), after the cleaning step 120. Note that, as necessary, a coating step 140 of coating the model material MD with a coating liquid LQ3 may be performed after the rinsing step 130.

The model material MD is a material that is used in a fused deposition modeling method, an inkjet method, or the like, and examples thereof include an ultraviolet curable resin, a thermosetting resin, a thermoplastic resin, and the like. More specifically, examples of the model material MD include an acrylonitrile-butadiene-styrene resin, a polycarbonate resin, a polyphenyl sulfone resin, a polyether imide resin, an acrylic resin, a polypropylene resin, and the like. In addition, examples of a commercially available product thereof include VisiJet (Registered Trademark, the same applies to the followings) MX, VisiJet EX200, VisiJet SR200, VisiJet HR200, VisiJet DP200, VisiJet CPX200, and VisiJet M2R-CL (manufactured by 3D SYSTEMS JAPAN K.K.), and the like.

In addition, AR-G1L (manufactured by KEYENCE CORPORATION) can also be used as the model material MD.

Components of AR-G1L:

Silicone 65 weight %

Acrylic Monomer 30 to 35 weight %

Organophosphorus Compound 1 to 5 weight %

Phenone Compound 1 to 5 weight %

Examples of the support material SP include aliphatic alcohol. Aliphatic alcohol having 1 to 24 carbon atoms is preferable as the aliphatic alcohol. Examples of the aliphatic alcohol include stearyl alcohol (CAS No. 112-95-5) and the like. Examples of a commercially available product thereof include VisiJet200 (manufactured by 3D SYSTEMS JAPAN K.K.) and the like.

In addition, AR-S1 (manufactured by KEYENCE CORPORATION) can also be used as the support material SP.

Components of AR-S1:

| | |
|---|---|
| Acrylic Monomer | 10 to 25 weight % |
| Polypropylene Glycol | 70 to 90 weight % |
| Photopolymerization Initiater | 1 to 5 weight % |
| Density of Support Material SP: | 1.03 (g/cm$^3$) |

It is preferable that the preliminary cleaning agent LQ1 has hydrophobicity as a whole and easily dissolves the support material SP. Examples of the preliminary cleaning agent LQ1 include fatty acid ester that is used as base oil, and among them, vegetable oil-derived fatty acid ester is preferable. It is preferable that a melting point of the fatty acid ester is lower than a melting point of the support material SP.

Note that, a measurement method of the melting point is based on JIS K 0064-1992 (the same applies to the followings).

In addition, it is preferable that the preliminary cleaning agent LQ1 is solidified (gelled) in a comparatively low temperature range (for example, lower than the melting point of the support material SP). Accordingly, in the preliminary cleaning agent LQ1, another compound may be mixed in addition to the fatty acid ester. That is, it is preferable that a melting point or a softening temperature of a mixture containing the fatty acid ester and the another compound is higher than that of the fatty acid ester. Accordingly, the preliminary cleaning agent LQ1 is liquefied or softened by heating when in use, whereas the fluidity disappears when not in use, and thus, the handling thereof is excellent. The concentration of the fatty acid ester in the preliminary cleaning agent LQ1 is not particularly limited insofar as the effect of the invention can be obtained, and for example, the lower limit thereof is preferably greater than or equal to 30 weight %, more preferably greater than or equal to 50 weight %, and particularly preferably greater than or equal to 80 weight %. Examples of the another compound include solid paraffin (CAS No. 8002-74-2, English Name: Paraffin wax), the same compound as the support material SP, a compound containing a component common to the support material SP, and the like, and such compounds may be independently used or may be used in combination. An upper limit of the concentration of the solid paraffin is not particularly limited insofar as the effect of the invention can be obtained, and for example, is 80 weight %, preferably 70 weight %, and more preferably 60 weight %. Therefore, the preliminary cleaning agent LQ1 that was used in the preliminary cleaning step 110 in the past can be used again in the preliminary cleaning step 110, within a range in which the effect of the invention can be obtained.

Note that, a measurement method of the softening temperature is based on JIS K 7206-1991 (the same applies to the followings).

The cleaning agent LQ2 is soluble in water as a whole, and contains a solvent and a surfactant. The cleaning agent LQ2, as necessary, may contain additives.

Water or alcohol is preferable as the solvent. It is preferable that the water is distilled water. For example, methanol, ethanol, propanol, butanol, pentanol, ethylene glycol, glycerin, or the like can be applied as the alcohol. The concentration of the solvent is not particularly limited insofar as the effect of the invention can be obtained, and is preferably greater than or equal to 10 weight % and less than or equal to 99 weight %, more preferably greater than or equal to 50 weight % and less than or equal to 99 weight %, and even more preferably greater than or equal to 60 weight % and less than or equal to 99 weight %.

The surfactant acts on the removal of the support material SP from the model material MD. Examples of the surfactant include an anionic surfactant, a cationic surfactant, a nonionic surfactant, an amphoteric surfactant, or the like.

Examples of the anionic surfactant include a sodium salt or a potassium salt of a fatty acid, an alkyl benzene sulfonate, a higher alcohol sulfuric ester salt, a polyoxyalkylene monoalkyl ether salt, α-sulfofatty acid ester, an α-olefin sulfonate, a monoalkyl phosphoric ester salt, an alkane sulfonate, and the like.

Examples of the cationic surfactant include an alkyl trimethyl ammonium salt, a dialkyl dimethyl ammonium salt, an alkyl dimethyl benzyl ammonium salt, an amine salt (for example, an N-methyl bishydroxyethyl amine fatty acid ester hydrochloride), and the like.

Examples of the amphoteric surfactant include an alkyl aminofatty acid salt, alkyl betaine, alkyl amine oxide, and the like.

Examples of the nonionic surfactant include polyoxyethylene alkyl ether, polyoxyethylene alkyl phenol ether, alkyl glucoside, polyoxyethylene fatty acid ester, sucrose fatty acid ester, sorbitan fatty acid ester, polyoxyethylene sorbitan fatty acid ester, fatty acid alkanol amide, and the like.

It is preferable to have an amino group and a hydrophilic group (excluding an amino group), as a specific example of the surfactant. Examples of the hydrophilic group (excluding an amino group) include a hydroxy group, a carboxy group, a carbonyl group, a sulfo group, and the like. Specific examples thereof include ethanol amines (monoethanol amine, diethanol amine, or triethanol amine) and the like. In addition, polyoxyalkylene monoalkyl ether (CAS No. 77029-64-2) or the like can also be used.

The concentration of the surfactant is not particularly limited insofar as the effect of the invention can be obtained, and is preferably greater than or equal to 1 weight % and less than or equal to 40 weight %, more preferably greater than or equal to 1 weight % and less than or equal to 30 weight %, and even more preferably greater than or equal to 1 weight % and less than or equal to 25 weight %.

Examples of the additive include a metal ion builder, an alkali builder, a dispersionre-contamination prevention builder, an enzyme, a fluorescent brightening agent, a bleaching agent, a foam control agent, other adjuvants, and the like, for example, include sodium xylene sulfonate (CAS No. 1300-72-7), sodium silicate (CAS No. 6834-92-0), and the like. The concentration of the additive is not particularly limited insofar as the effect of the invention can be obtained, and is preferably greater than or equal to 1 weight % and less than or equal to 20 weight %.

The coating liquid LQ3 is not limited insofar as the coating liquid is capable of forming a coating layer having light transmissivity with respect to the surface of the model material MD. It is preferable to include alcohol having an amino group as the coating liquid LQ3. Examples of the alcohol having an amino group include ethanol amines (monoethanol amine (CAS 141-43-5), diethanol amine (CAS 111-42-2), triethanol amine (CAS 102-71-6)), and the like. Note that, an aqueous solution of the ethanol amines is preferable. The concentration of the ethanol amines is not particularly limited insofar as the effect of the invention can be obtained, and is preferably greater than or equal to 10 weight % and less than or equal to 40 weight %.

Note that, the coating liquid LQ3 may contain a component common to the cleaning agent LQ2.

Figure 2:
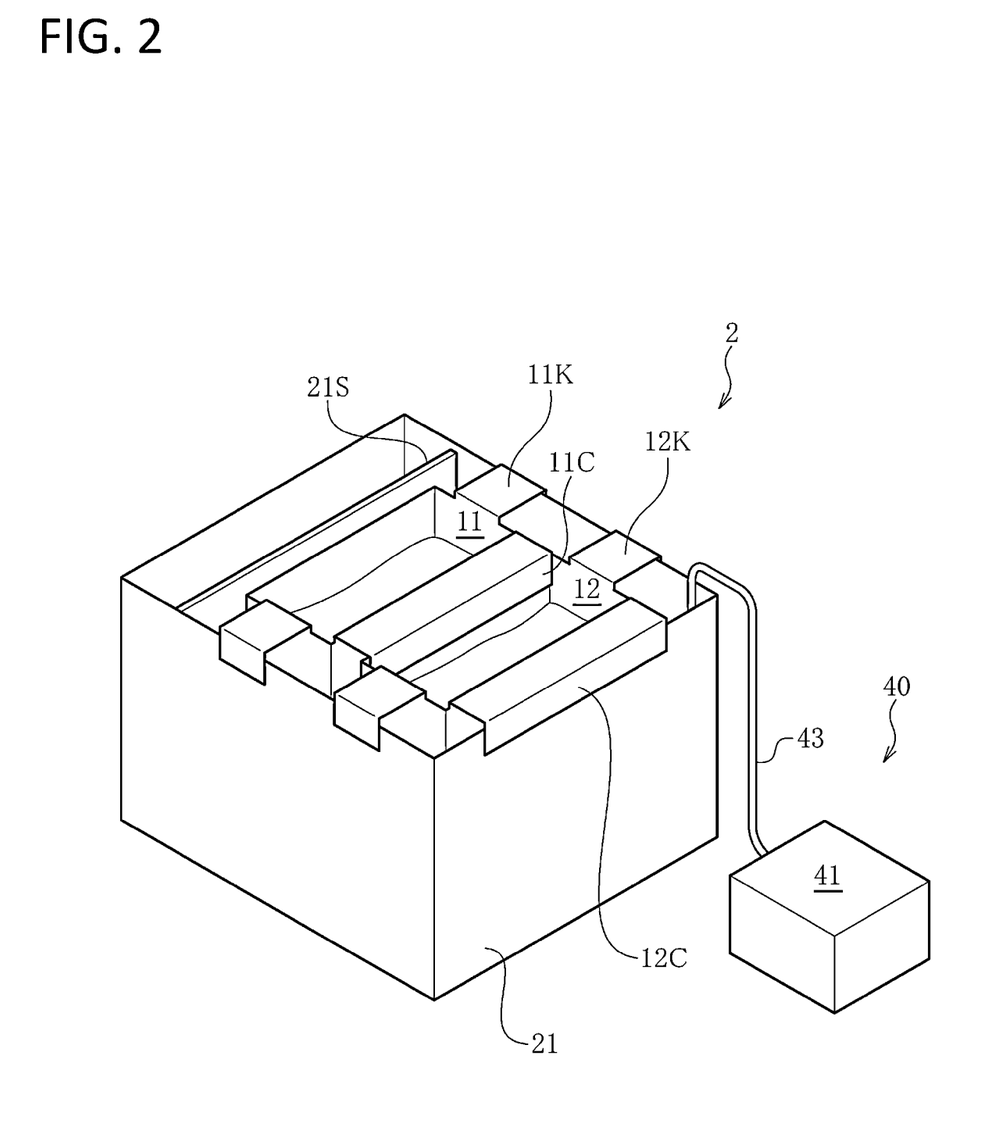
FIG. 2 is a perspective view illustrating an outline of a cleaning device.
Figure 3A:
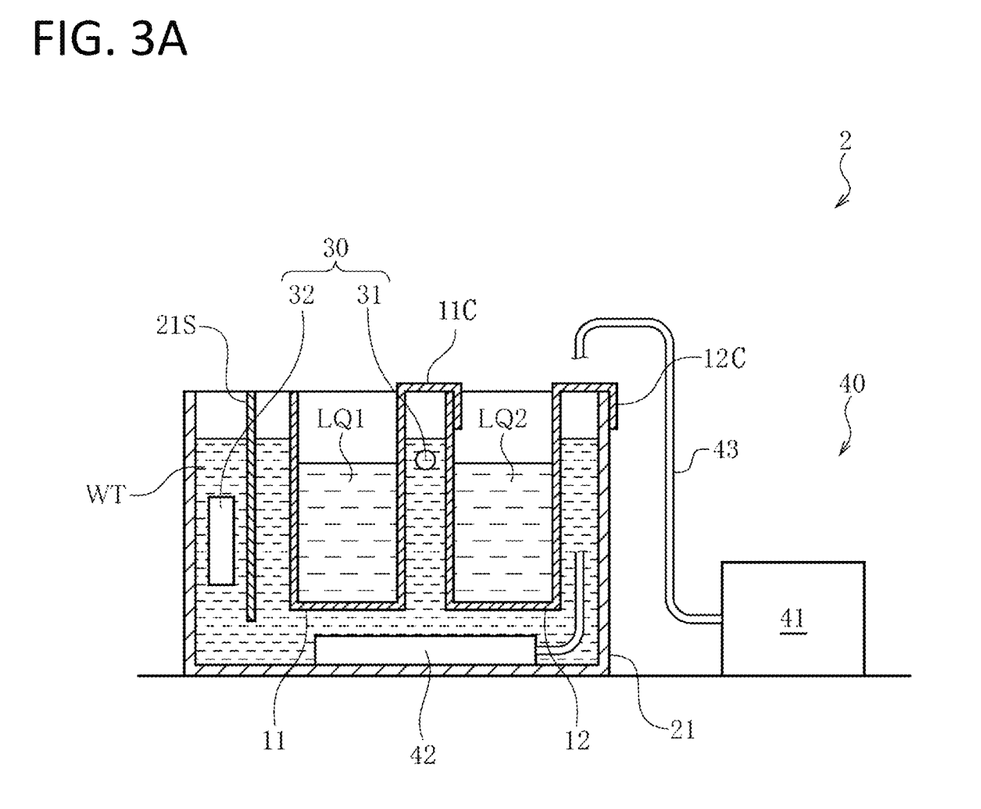
FIG. 3A is a sectional view illustrating an outline of the cleaning device.
Figure 3B:
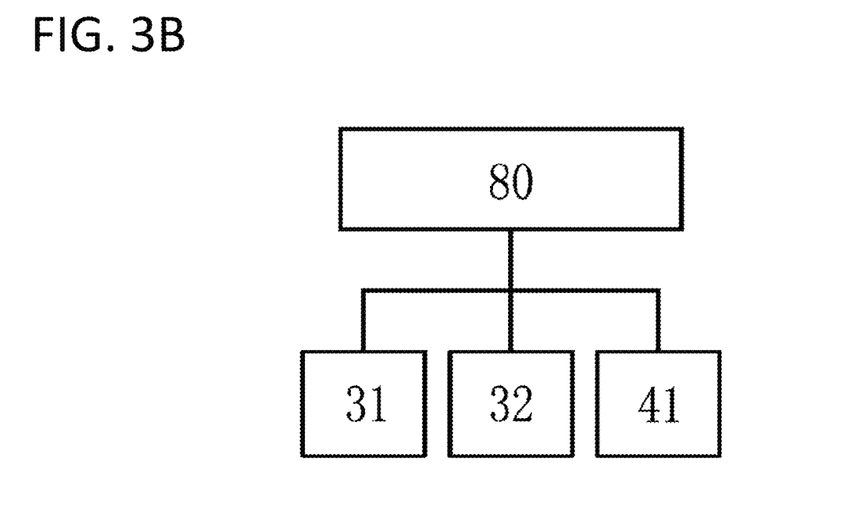
FIG. 3B is a block diagram illustrating an outline of the cleaning device.

As illustrated in FIGS. 2 and 3A and 3B, a cleaning device 2 is for performing the preliminary cleaning step 110 to the cleaning step 120 of the cleaning method 100, and includes a preliminary cleaning tank 11 containing the preliminary cleaning agent LQ1, a cleaning tank 12 containing the cleaning agent LQ2, an outer container 21 containing the preliminary cleaning tank 11 and the cleaning tank 12, a temperature adjustment unit 30 for adjusting the temperature of water WT contained in the outer container 21, an ultrasonic unit 40 for applying an ultrasonic wave to the water WT, or to the preliminary cleaning agent LQ1 or the cleaning agent LQ2 through the preliminary cleaning tank 11 or the cleaning tank 12, and a controller 80 controlling each of the units.

Both of the preliminary cleaning tank 11 and the cleaning tank 12 contain a material having excellent thermal conductivity (for example, a metal or the like). The outer container 21 contains the water WT. The middle portion to the bottom portion of the preliminary cleaning tank 11 and the cleaning tank 12 are dipped in the water WT. An engagement portion 12K is provided on an opening edge of the cleaning tank 12. The engagement portion 12K is engaged with an opening edge of the outer container 21, and thus, the cleaning tank 12 is capable of maintaining a state of being separated from the bottom of the outer container 21. An engagement portion 11K is provided on an opening edge of the preliminary cleaning tank 11. The engagement portion 11K is engaged with the opening edge of the cleaning tank 12, and thus, the preliminary cleaning tank 11 is capable of maintaining a state of being separated from the bottom of the outer container 21. Note that, the engagement portion 11K may be engaged with the opening edge of the outer container 21.

The engagement portion 11K of the preliminary cleaning tank 11 and the engagement portion 12K of the cleaning tank 12 also function as a cover for preventing impurities such as the first liquid LQ1 and the second liquid LQ2 from being mixed in the water WT.

The temperature adjustment unit 30 includes a temperature sensor 31 detecting the temperature of the water WT contained in the outer container 21, and a heater 32 heating the water WT contained in the outer container 21.

The ultrasonic unit 40 includes a control box 41 disposed outside the outer container 21, an oscillator 42 disposed in the water WT of the outer container 21, and a cable 43 connecting the control box 41 and the oscillator 42. The frequency of the ultrasonic wave of the ultrasonic unit 40 is not particularly limited, and for example, is preferably greater than or equal to 30 Hz and less than or equal to 60 Hz. An application time of the ultrasonic wave is not also particularly limited.

A cover 21S for covering the heater is provided in the outer container 21. The cover 21S partitions the outer container 21 other than the bottom portion. Accordingly, the heat from the heater 32 is transferred to the preliminary cleaning agent or the cleaning agent, and a failure due to the application of an ultrasonic wave with respect to the heater 32 is suppressed.

Figure 6:
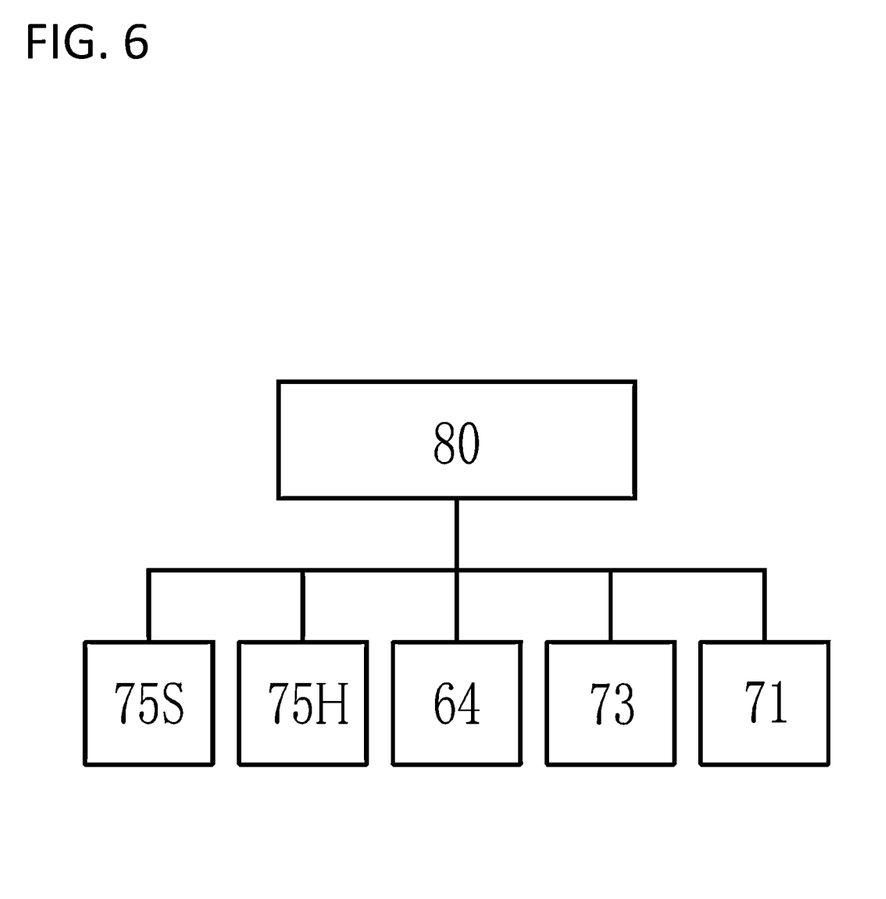
FIG. 6 is a block diagram illustrating connection between a controller and each unit.

The controller 80 is electrically connected to the temperature sensor 31, the heater 32, the control box 41, or the like.

Next, the cleaning method 100 will be described by using FIGS. 4A, 4B, 4C and 4D.

(Preliminary Cleaning Step 110)

Figure 4A:
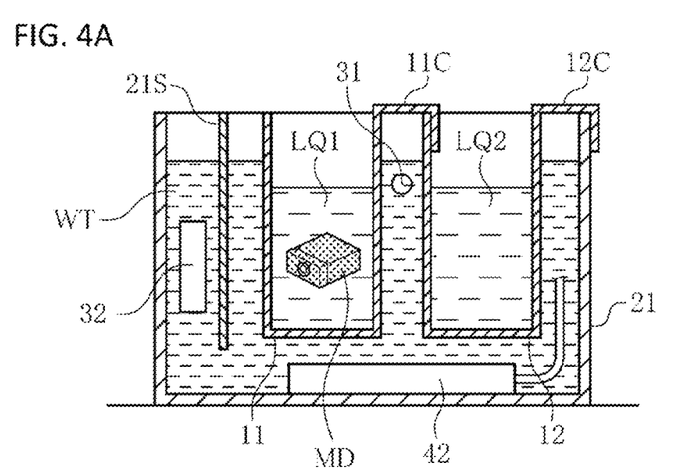
FIG. 4A is a sectional view illustrating an outline of the cleaning device in the preliminary cleaning step of the cleaning method.

The temperature adjustment unit 30 adjusts the temperature of the preliminary cleaning agent LQ1 or the cleaning agent LQ2 in a range of lower than the melting point of the model material and higher than or equal to the melting point of the support material, under the control of the controller

80. At this time, both of the preliminary cleaning agent LQ1 and the cleaning agent LQ2 are a liquid and have fluidity. Further, power is applied to the ultrasonic unit 40, and an ultrasonic wave is applied to the preliminary cleaning agent LQ1 or the cleaning agent LQ2, under the control of the controller 80.

Figure 4B:
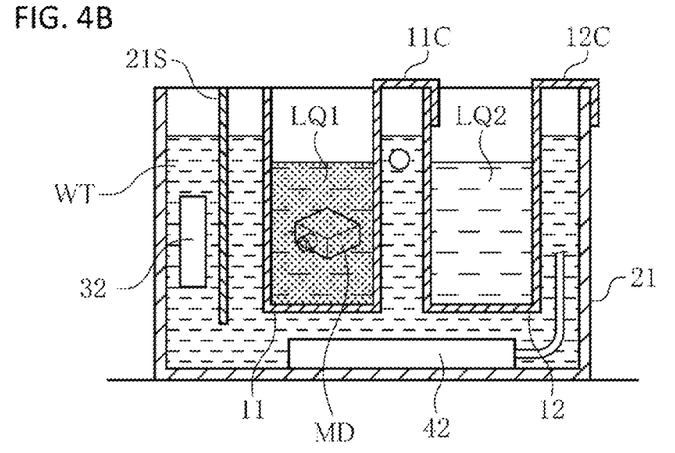
FIG. 4B is a sectional view illustrating an outline of the cleaning device in the preliminary cleaning step of the cleaning method.

Next, the model material MD to which the support material SP is attached is put in the preliminary cleaning agent LQ1 (FIG. 4A). Since the preliminary cleaning agent LQ1 contains a component having compatibility with respect to the support material SP, most of the support material SP is dissolved in the preliminary cleaning agent LQ1 (FIG. 4B). After a predetermined period of time has elapsed, the model material MD is pulled up from the preliminary cleaning agent LQ1. As described above, most of the support material SP is removed from the model material MD by the action of the preliminary cleaning agent LQ1, the temperature, or the ultrasonic wave.

When the model material MD is pulled up from the preliminary cleaning agent LQ1, a part of the support material SP remains in the model material MD.

(Cleaning Step 120)

Figure 4C:
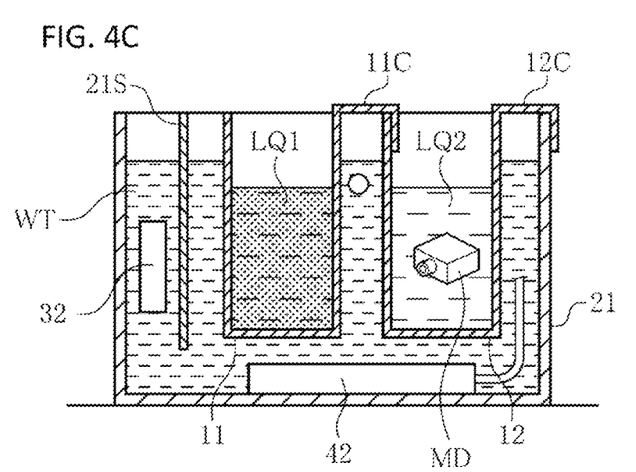
FIG. 4C is a sectional view illustrating an outline of the cleaning device in the cleaning step of the cleaning method.

Next, the model material MD to which the support material SP is attached is put in the liquid cleaning liquid LQ2 (FIG. 4C). Most of the remaining support material SP is removed from the model material MD by the action of the component (in particular, the surfactant) of the cleaning liquid LQ2 to exist in the cleaning agent LQ2.

When the model material MD is pulled up from the cleaning agent LQ2, almost no support material SP remains in the model material MD. At this time, the support material SP remaining in the model material MD is easily washed out with water, an aqueous solution, or the like, by the action of the surfactant contained in the cleaning agent LQ2.

(Rinsing Step 130)

Figure 4D:
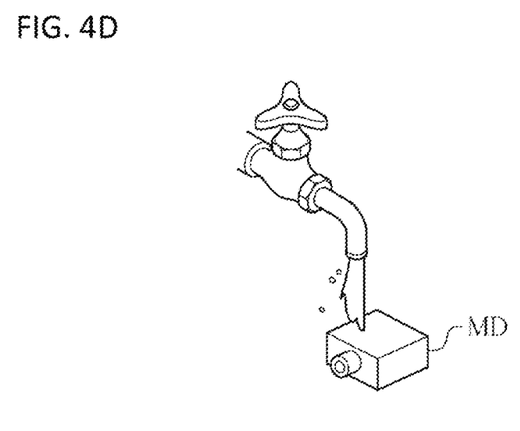
FIG. 4D is a perspective view illustrating an outline of the cleaning device in the rinsing step of the cleaning method.

The model material MD pulled up from the cleaning agent LQ2 is put in water (FIG. 4D). The temperature of the water may be a room temperature, and is more preferably lower than the melting point of the model material and higher than the melting point of the support material SP. It is preferable that the water is distilled water.

Note that, in the rinsing step 130, another tank containing hot water of a predetermined temperature may be put in the outer container 21 and an ultrasonic wave may be applied in a state where the model material MD is dipped in the hot water. In addition, in the rinsing step 130, an aqueous solution in which another compound (for example, alcohol or the like) is dissolved in distilled water, an aqueous solution in which another compound is dispersed in distilled water, or the like may be used instead of the distilled water. That is, it is preferable that the rinsing liquid used in the rinsing step 130 has compatibility with respect to the cleaning agent LQ2.

(130140)

As necessary, the model material MD is put in the coating liquid LQ3. After a predetermined period of time has elapsed, the model material MD is pulled up from the coating liquid LQ3. Accordingly, the surface layer of the model material MD is coated with the coating liquid LQ3. After that, the coating layer is formed on the surface layer of the model material MD by the elapse of a predetermined period of time.

As described above, according to the invention, since a liquid material such as the preliminary cleaning agent LQ1 or the cleaning agent LQ2 is used, even in a case where the model material MD has an intricate shape, the liquid reaches the depth of the shape, and thus, the support material SP in the depth of the shape can be removed.

Here, a case is considered in which the cleaning step 120 is performed with respect to the model material MD to which the support material SP is attached without performing the preliminary cleaning step 110. In the cleaning step 120, in a case where the cleaning agent LQ2 is brought into contact with the model material MD, the support material SP attached to the model material MD can be removed by the action of the surfactant contained in the cleaning agent LQ2. However, since the degree of removing action of the support material SP according to the surfactant is greatly affected by the amount of surfactant, in a case where the cleaning step 120 is performed with respect to the model material MD to which a large amount of the support material SP is attached without performing the preliminary cleaning step 110, a large amount of the support material SP may be contained in the cleaning agent LQ2. In the cleaning agent LQ2 in such a state, the removing action of the support material SP can hardly be expected.

It can be assumed that a decrease in the removing action of the support material SP is caused by a decrease in the removing action due to a decrease in the concentration of the cleaning agent LQ2 in the cleaning tank 12, and the improvement of a viscosity due to an increase in the concentration of the support material SP in the cleaning tank 12.

Accordingly, in order to maintain the removing action of the support material SP in the cleaning step 120, it is necessary to add a new cleaning agent LQ2.

In the invention, the support material SP is brought into contact with the preliminary cleaning agent LQ1 that is capable of dissolving the support material, before the support material SP is brought into contact with the cleaning agent LQ2 that is capable of removing the support material. Accordingly, the amount of support material SP that is attached to the model material MD can be minimized at a start point of the cleaning step 120. Accordingly, a removing effect of the support material SP according to the cleaning agent LQ2 in the cleaning step 120 can be maintained. In addition, a removing action of the support material SP according to the preliminary cleaning agent LQ1 is an action according to compatibility with respect to the support material SP, but not the action of the surfactant such as the cleaning agent LQ2. Accordingly, even in a case where a large amount of support material SP remains in the preliminary cleaning agent LQ1, the removing action of the support material SP can be maintained. As described above, the removing action of the support material SP can be maintained by combining the preliminary cleaning step 110 and the cleaning step 120.

Further, when the model material MD is pulled up from the cleaning agent LQ2, almost no support material SP remains in the model material MD. At this time, the support material SP remaining in the model material MD is easily washed out with water, an aqueous solution, or the like, by the action of the surfactant contained in the cleaning agent LQ2. Accordingly, the support material SP can be removed from the model material MD by performing the rinsing step 130 after the cleaning step 120.

In addition, a mixture of the preliminary cleaning agent LQ1 and the support material SP may have fluidity in the preliminary cleaning step 110, and it is preferable that the fluidity is lost in a low temperature range (for example, a room temperature). Accordingly, the mixture is easily handled as a waste material. Further, such a mixture can also be used as a general waste material, or can also be used as fuel.

Note that, a layer containing the mixture of the preliminary cleaning agent LQ1 and the support material SP is formed on the surface of the model material MD pulled up from the preliminary cleaning agent LQ1. In a case where such a model material MD is at a temperature lower than the melting point of the support material SP (for example, a normal temperature), the layer is solidified (gelled). In addition, the layer is dissolved at a temperature higher than the melting point of the support material SP. Therefore, the layer containing the mixture of the preliminary cleaning agent LQ1 and the support material SP can also be used as a protective layer of the model material.

On the other hand, the mixture of the cleaning agent LQ2 and the support material SP is a liquid in the cleaning step 120, but is soluble in water, and thus, is comparatively safe. Such a mixture is easily managed as a waste material. In addition, the mixture of the cleaning agent LQ2 and the support material SP may have fluidity in the cleaning step 120, and it is preferable that the fluidity is lost in a low temperature range (for example, a room temperature).

In addition, the model material MD may be weak against heat, in accordance with the material thereof. In such a case, the model material MD may be deformed in accordance with a temperature increase. In such a case, in a case where the model material MD is heated in the air, the model material is easily deformed by the own weight. According to the invention, the model material MD is heated in solution, and thus, the deformation of the model material due to the own weight is suppressed by a buoyant force, compared to a case where the model material is heated in the air.

In the case of imparting glossiness to the model material MD after the rinsing step 130, the coating step 140 is performed, and the coating layer having light transmissivity is formed by the coating liquid LQ3, and thus, the glossiness increases, and the appearance is improved.

The reason for an increase in the glossiness according to the coating layer and the improvement of the appearance is assumed as follows. A lamination trace at the modeling may remain in the shape of a stripe, on the surface of the model material MD. In the case of removing the support material SP, the glossiness is lost by reflection due to the lamination trace at the modeling, and the appearance becomes cloudy. On the other hand, in a case where the coating layer is formed on the lamination trace at the modeling, reflection occurs on the coating layer, and thus, the glossiness increases, and the appearance is improved.

In the embodiment described above, in the cleaning method 100, the coating step 140 is performed, but the invention is not limited thereto. In the case of trying not to allow impurities (the support material SP, the coating layer of the coating liquid LQ3, or the like) to remain on the surface of the model material MD or in a case where the appearance is not required, the coating step 140 may be omitted.

Note that, it is preferable that the density of the solvent of the cleaning agent LQ2 is different from the density of the support material SP. For example, in a case where the density of the support material SP is greater than the density of the solvent of the cleaning agent LQ2, in a second dipping step, the support material SP is separated from the cleaning agent LQ2 by a density difference, and sinks into the bottom of the cleaning tank 12. Accordingly, in a case where the model material MD is tried to be pulled out from the cleaning agent LQ2, the removed support material SP is less likely to be attached again to the model material MD.

In the embodiment described above, in the cleaning method 100, the preliminary cleaning step 110 is performed, but the invention is not limited thereto. In a case where an attachment amount of the support material that is attached to the model material MD is small, the preliminary cleaning step 110 may be omitted.

In the embodiment described above, the cleaning step 120 is performed in a state in which the opening of the preliminary cleaning tank 11 or the cleaning tank 12 is released with respect to the atmospheric air, but the invention is not limited thereto. For example, the cleaning step 120 may be performed in a state in which each opening is sealed with respect to the atmospheric air.

The cleaning device 2 may include a sealing unit 60 containing the preliminary cleaning tank 11 or the cleaning tank 12, a pump 70 (a decompression unit) reducing the pressure of the internal space of the sealing unit 60, and a temperature adjustment unit 75, in addition to the configuration described above (FIG. 5A).

Figure 5A:
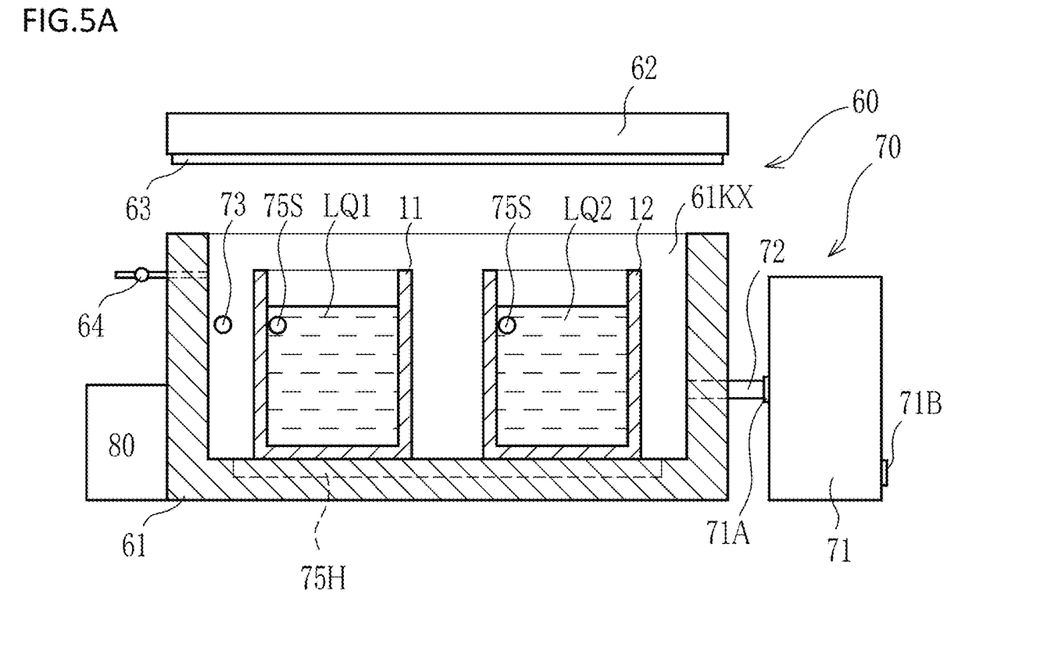
FIG. 5A is a partial sectional view illustrating an outline of a sealing unit that can be applied to the cleaning device.
Figure 5B:
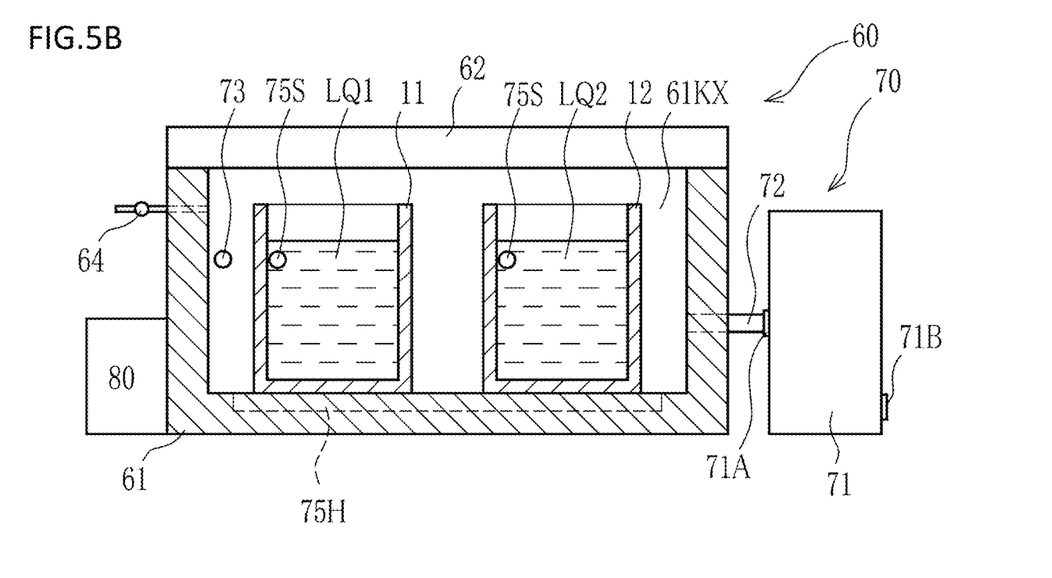
FIG. 5B is a partial sectional view illustrating an outline of a sealing unit that can be applied to the cleaning device.

The sealing unit 60 includes a containing tool 61, a lid 62 capable of closing an opening of the containing tool 61, a packing 63 provided on the lid 62, and a release valve 64. The containing tool 61 includes a containing space 61KX that is capable of containing the preliminary cleaning tank 11 or the cleaning tank 12. An opening of the containing space 61KX is opened upward. In a case where the opening of the containing space 61KX is closed by using the lid 62, the containing space 61KX is sealed by the packing 63 (FIG. 5B). The release valve 64 can be freely switched between an open state in which the containing space 61KX is communicated with the external space and a closed state in which the containing space 61KX and the external space are not connected, under the control of the controller 80.

The pump 70 includes a pump main body 71 provided with an air inlet 71A and an air outlet 71B, piping 72 communicating the air inlet 71A with the containing space 61KX, and a pressure meter 73 measuring the pressure of the containing space 61KX. The controller 80 drives the pump main body 71 while reading a measured value of the pressure meter 73. Accordingly, the pump 70 is capable of adjusting the internal pressure of the containing space 61KX to a predetermined range, under the control of the controller 80.

The temperature adjustment unit 75 includes a temperature sensor 75S detecting each temperature of the cleaning agents LQ1 to LQ2 contained in the preliminary cleaning tank 11 and the cleaning tank 12, respectively, and an induction heating-type heater 75H provided on the bottom surface inside the containing tool 61.

The temperature adjustment unit 75 adjusts the temperature of the preliminary cleaning agent LQ1 or the cleaning agent LQ2 to a range of lower than the melting point of the model material and higher than or equal to the melting point of the support material, under the control of the controller 80. At this time, both of the preliminary cleaning agent LQ1 and the cleaning agent LQ2 are a liquid.

Note that, as necessary, an ultrasonic wave may be applied to the preliminary cleaning agent LQ1 or the cleaning agent LQ2 by using the ultrasonic unit 40 (FIG. 3A), under the control of the controller 80.

Next, a method for using the sealing unit 60 will be described.

(Preliminary Cleaning Step 110)

As illustrated in FIG. 5A, the preliminary cleaning tank 11 is disposed in the containing space 61KX. The model material MD to which the support material SP is attached is put in the preliminary cleaning agent LQ1. The temperature adjustment unit 75 adjusts the temperature of the preliminary cleaning agent LQ1 to a range lower than the melting point of the model material MD and higher than or equal to the melting point of the support material SP, under the control of the controller 80.

Next, the release valve 64 is closed. In the case of closing the opening of the containing space 61KX by using the lid 62, the containing space 61KX becomes a sealing space by the packing 63 (FIG. 5B). The pump 70 adjusts the internal pressure of the containing space 61KX to a predetermined range, under the control of the controller 80.

Since the preliminary cleaning agent LQ1 contains the component having compatibility with respect to the support material SP, most of the support material SP is dissolved in the preliminary cleaning agent LQ1. Further, the model material MD to which the support material SP is attached is placed in an environment in which the pressure is lower than the atmospheric pressure, and thus, gas existing in the support material SP or in a boundary portion between the model material MD and the support material SP is moved to the outside. As a result of such air exchange, the removal of the support material SP from the model material MD is performed. After a predetermined period of time has elapsed, the pump 70 is stopped, the release valve 64 is opened, the lid 62 is opened, and the model material MD from the preliminary cleaning agent LQ1 is pulled up.

(Cleaning Step 120)

Next, the model material MD pulled up from the preliminary cleaning agent LQ1 is put in the cleaning liquid LQ2. The temperature adjustment unit 75 adjusts the temperature of the cleaning agent LQ2 to a range of lower than the melting point of the model material MD and higher than or equal to the melting point of the support material SP, under the control of the controller 80.

Next, in a case where the release valve 64 is closed, and the opening of the containing space 61KX is closed by using the lid 62, the containing space 61KX becomes the sealing space by the packing 63 (FIG. 5B). The pump 70 adjusts the internal pressure of the containing space 61KX to a predetermined range, under the control of the controller 80.

The remaining support material SP is removed from the model material MD to exist in the cleaning agent LQ2, by the action of the surfactant of the cleaning liquid LQ2. Further, the model material MD to which the support material SP is attached is disposed in an environment in which the pressure is lower than the atmospheric pressure, and thus, the removal of the support material SP from the model material MD is performed. As a result thereof, a small amount of the support material SP remains in the model material MD. After a predetermined period of time has elapsed, the pump 70 is stopped, the release valve 64 is opened, the lid 62 is opened, and the model material MD is pulled up from the cleaning agent LQ2.

Here, the factor that the removal of the support material SP from the model material MD is accelerated in the case of performing the preliminary cleaning step 110 or the cleaning step 120 in an environment in which the pressure is lower than the atmospheric pressure is assumed as follows.

A constant amount of gas exists in the support material SP or in the boundary portion between the model material MD and the support material SP, at a modeling completion point of the model material MD. However, even in the case of performing the preliminary cleaning step 110 or cleaning step 120 in an environment of approximately the same air pressure identical as that at the modeling, the gas still exists inside. However, in the case of performing the preliminary cleaning step 110 or the cleaning step 120 in an environment in which the pressure is lower than that at the modeling, by using the pump 70, the gas easily flies out to the external space by an air pressure difference. As a result of such air exchange, the removal of the support material SP from the model material MD is accelerated.

Note that, it is preferable that the pump 70 reduces the internal pressure of the containing space 61KX to the extent that the cleaning liquid LQ2 is in a boiling state. The air exchange is accelerated by a boiling phenomenon, and thus, the removal of the support material SP from the model material MD is performed.

(Rinsing Step 130)

After that, the model material MD pulled up from the cleaning agent LQ2 is put in a beaker containing hot water to perform the rinsing step 130. It is preferable that the temperature of the hot water is adjusted to a range of lower than the melting point of the model material MD and higher than or equal to the melting point of the support material SP. An ultrasonic wave may be applied to the hot water contained in the beaker by driving the ultrasonic unit 40.

As described above, by performing the preliminary cleaning step 110 or the cleaning step 120 in an environment in which the pressure is lower than the atmospheric pressure, the removal of the support material SP from the model material MD is accelerated. In order to obtain the removing action of the support material SP from the model material MD, a higher temperature is required, but the preliminary cleaning step 110 or the cleaning step 120 is performed in an environment of a lower pressure, and thus, it is possible to obtain the removing action of the support material SP from the model material MD without forming an environment of a higher temperature. Therefore, in a case where the material of the model material MD is weak against heat, the preliminary cleaning step 110 or the cleaning step 120 is performed in an environment in which the pressure is lower than the atmospheric pressure, and thus, it is possible to obtaining the removing action of the support material SP while avoiding thermal deformation.

In an environment released to the external space, such as the cleaning device 2 illustrated in FIGS. 2, 3A and 3B, the preliminary cleaning step 110 or the cleaning step 120 may be performed while driving the ultrasonic unit 40, between the preliminary cleaning step 110 in the sealing unit 60 and the cleaning step 120 in the sealing unit 60 or after the cleaning step 120 in the sealing unit 60.

In addition, the preliminary cleaning step 110 may be omitted in accordance with a desired cleaning degree.

In the embodiment described above, the invention is used in the removal of the support material SP, but the invention is not limited thereto. For example, the invention may be applied to the removal of a buffing compound (a metal or a non-ferrous mirror polishing agent) in which chromium oxide is kneaded into an oil and fat material (a paraffin-based wax).

In the embodiment described above, the material that is used in the fused deposition modeling method, the inkjet method, or the like is used as the model material MD, but the invention is not limited thereto. A metal (for example, iron or non-ferrous metals) work may be used as the model material MD. The invention may be used for removing the support material attached to the metal work, or may be used for the following objects.

However, since cutting oil is attached to the metal work after cutting machining, it is necessary to remove the cutting oil in the case of using the metal work in such a state. Examples of the cutting oil that can be removed include oil-based cutting oil or water-soluble cutting oil. In addition, since the metal work such as iron is weak against rust, it is necessary to coat the metal work with rust-proof oil at transportation or storage.

In such a case, a part of the cleaning method 100 may be performed with respect to the metal work. In the preliminary cleaning step 110, the metal work is dipped in the preliminary cleaning agent LQ1. Accordingly, most of the oil-based cutting oil attached to the metal work is dissolved in the preliminary cleaning agent LQ1. As a result thereof, most of the oil-based cutting oil can be removed from the metal work.

Next, in the cleaning step 120, the metal work is dipped in the cleaning agent LQ2. Accordingly, the coating layer of the cleaning agent LQ2 is formed on the surface of the metal work. Such a coating layer functions as a rust-proof layer. Note that, the rinsing step 130 or the coating step 140 may not be performed after the cleaning step 120.

The same cleaning agent used for dissolving the support material SP can be applied as the preliminary cleaning agent LQ1 for removing the oil-based cutting oil.

The cleaning agent LQ2 for forming the rust-proof layer is soluble in water as a whole, and contains a solvent and a rust-proof component.

Water or alcohol is preferable as the solvent. The concentration of the solvent is not particularly limited insofar as the effect of the invention can be obtained, and is preferably greater than or equal to 5 weight % and less than or equal to 100 weight %, more preferably greater than or equal to 50 weight % and less than or equal to 100 weight %, and particularly preferably greater than or equal to 80 weight % and less than or equal to 100 weight %.

It is preferable to have an amino group and a hydrophilic group (excluding an amino group), as the rust-proof component. Examples of the hydrophilic group (excluding an amino group) include a hydroxy group, a carboxy group, a carbonyl group, a sulfo group, and the like. Specific examples thereof include ethanol amines (monoethanol amine, diethanol amine, or triethanol amine) and the like. The concentration of the cleaning component is not particularly limited insofar as the effect of the invention can be obtained, and is preferably greater than or equal to 10 weight % and less than or equal to 40 weight %.

In the embodiment described above, the removal of the cutting oil from the metal work has been described, but the invention is not limited thereto. The invention can also be applied to grease in addition to the cutting oil.

Examples

Tests A1 to A25 were performed.
(Test A1)
A three-dimensional modeled object X was formed from the model material MD and the support material SP by using a 3D printer (VisiJet series, manufactured by 3D Systems Corporation). The model material MD in the three-dimensional modeled object X is in a rectangular parallelepiped shape (Length: 50 mm, Breadth: 30 mm, Height: 30 mm). In the model material MD in a rectangular parallelepiped shape, five linear through holes (Diameter: 0.5 mm, Length: 30 mm) passing through the model material MD from the top surface toward the bottom surface and five curved through hole (Diameter: 0.5 mm) passing through the model material MD from the top surface toward the lateral surface were formed. The support material SP was attached to each of the surfaces of the model material MD with a uniform thickness (approximately 10 to 15 mm), and all of the through holes (the linear through holes and the curved through holes) were filled with the support material.

VisiJet Crystal EX200 Plastic Material (manufactured by 3D SYSTEMS JAPAN K.K.) was used as the model material MD.

Components of Model Material MD:

| | |
|---|---|
| Urethane Acrylate Oligomer | 20 to 40 weight % |
| Ethoxylated Bisphenol A Diacrylate (CAS No. 64401-02-01) | 15 to 35 weight % |
| Tripropylene Glycol Acrylate (CAS No. 42978-66-5) | 1.5 to 3 weight % |

VisiJet200 (manufactured by 3D SYSTEMS JAPAN K.K.) was used as the support material SP.

Components of Support Material SP: hydroxylated wax (CAS No. 112-95-5)

Melting Point of Support Material SP: 55 to 65° C.
Density of Support Material SP: 0.85 to 0.91 (g/cm$^3$)

The cleaning method 100 was performed with respect to the three-dimensional modeled object X.

The components of the used preliminary cleaning agent are as follows.

| | |
|---|---|
| Fatty Acid Ester | 70 weight % |
| Solid Paraffin (CAS No. 8002-74-2) | 30 weight % |

The components of the used cleaning agent are as follows.

| | |
|---|---|
| Water | 80 weight % |
| Triethanol Amine (CAS No. 102-71-6) | 20 weight % |

(Preliminary Cleaning Step)
In the sealing unit 60 illustrated in FIGS. 5A and 5B, the preliminary cleaning step was performed. A temperature T1 of the preliminary cleaning agent was maintained at 70° C. The three-dimensional modeled object X sank in the preliminary cleaning agent LQ1 (250 cm$^3$), the release valve 64 was closed, and the opening of the containing space 61KX was closed by using the lid 62. The containing space 61KX was decompressed by the pump 70. A decompression amount ΔP1 from the atmospheric pressure was 0.08 MPa. In the above condition, the preliminary cleaning step was performed. A time S1 for performing the preliminary cleaning step was 9 minutes.

(Cleaning Step)
Next, in the sealing unit 60, the cleaning step was performed. A temperature T2A of the cleaning agent was maintained at 65° C. The three-dimensional modeled object X sank in the cleaning agent LQ2 (250 cm$^3$), the release valve 64 was closed, and the opening of the containing space 61KX was closed by using the lid 62. The containing space 61KX was decompressed by the pump 70. The decompression operation was stopped at a point when the cleaning agent LQ2 started boiling. A decompression amount ΔP2 from the atmospheric pressure at the point when the cleaning agent LQ2 started boiling was 0.07 MPa. As described above, the cleaning step was performed by using the boiled cleaning agent LQ2. A time S2A for performing the cleaning step was 2 minutes.

Next, in the cleaning device 2 illustrated in FIG. 2, the cleaning step was performed. A temperature T2B of the cleaning agent was maintained at 65° C. The three-dimensional modeled object X sank in the cleaning agent LQ2

(250 cm³), and an ultrasonic wave was applied to the cleaning agent LQ2 by the ultrasonic unit 40. A frequency f2 of the applied ultrasonic wave was 40 KHz. A time S2B for performing the cleaning step was 2 minutes.

(Rinsing Step)

Next, a beaker was disposed in the outer container 21 of the cleaning device 2. 250 cm³ of water was poured into the beaker. A temperature T3 of the water was maintained at 65° C. The three-dimensional modeled object X sank in hot water, and an ultrasonic wave was applied to the water by the ultrasonic unit 40. A frequency f3 of the applied ultrasonic wave was 40 KHz. A time S3 for performing the rinsing step was 3 minutes.

(Tests A2 to A11 and A13 to A17)

The cleaning method of the support material was performed with respect to the three-dimensional modeled object X, as with Test A1, except for conditions shown in Table 1.

(Tests A18 to A20)

The components of the used preliminary cleaning agent are as follows.

| Fatty Acid Ester | 90 weight % |
| Solid Paraffin (CAS No. 8002-74-2) | 10 weight % |

Then, the cleaning method of the support material was performed with respect to the three-dimensional modeled object X, as with Test A1, except for conditions shown in Table 1.

(Tests A21 to A22)

The components of the used preliminary cleaning agent are as follows.

TABLE 1

| | preliminary cleaning agent | | Cleaning Step | | | | | | | | | | | Cleaning Degree Evaluation | |
|---|---|---|---|---|---|---|---|---|---|---|---|---|---|---|---|
| | Fatty Acid Ester | Solid Paraffin | Preliminary Cleaning Step | | | ΔP2 (MPa) | | | | | Rinsing Step | | | | |
| No. | (%) | (%) | T1 (° C.) | ΔP1 (MPa) | S1 (min) | T2A (° C.) | *1 boiled *2 unboiled | S2A (min) | T2B (° C.) | f2 (KHz) | S2B (min) | T3 (° C.) | f3 (KHz) | S3 (min) | Surface | Hole |
| Test A1 | 70 | 30 | 70 | 0.08 | 9 | 65 | 0.07 *1 | 2 | 65 | 40 | 3 | 65 | 40 | 3 | 3 | 5 |
| Test A2 | 70 | 30 | 70 | 0.08 | 9 | 65 | 0.07 *1 | 2 | 65 | 49 | 3 | 25 | 40 | 3 | 2 | 2 |
| Test A3 | 70 | 36 | 65 | 0.08 | 9 | — | — | — | — | — | — | 65 | 40 | 3 | 1 | 1 |
| Test A4 | 70 | 30 | 60 | 0.08 | 16 | 65 | 0.07 *1 | 2 | 55 | 40 | 3 | 65 | 40 | 3 | 3 | 5 |
| Test A5 | 70 | 36 | 65 | 0.08 | 9 | — | — | — | — | — | — | 65 | — | 3 | 1 | 1 |
| Test A6 | 70 | 30 | 65 | — | 20 | 65 | 0.07 *1 | 2 | 65 | 40 | 3 | 65 | 40 | 3 | 3 | 5 |
| Test A7 | 70 | 30 | 65 | — | 18 | 65 | 0.07 *1 | 2 | 65 | 40 | 3 | 65 | 40 | 3 | 3 | 5 |
| Test A8 | 70 | 30 | 65 | 0.08 | 10 | 65 | 0.07 *1 | 2 | 55 | 40 | 3 | 65 | 40 | 3 | 3 | 5 |
| Test A9 | 70 | 30 | 65 | 0.08 | 10 | 50 | 0.07 *1 | 2 | 65 | 40 | 3 | 65 | 40 | 3 | 3 | 5 |
| Test A10 | 70 | 30 | 65 | 0.08 | 10 | 65 | 0.07 *1 | 2 | 65 | 40 | 3 | 65 | — | 3 | 3 | 4 |
| Test A11 | 70 | 30 | 65 | 0.08 | 10 | 65 | 0.07 *1 | 2 | — | — | — | 65 | 40 | 3 | 3 | 4 |
| Test A12 | 70 | 30 | 65 | 0.08 | 10 | 65 | 0.03 *2 | 2 | 65 | 40 | 3 | 65 | 40 | 3 | 3 | 4 |
| Test A13 | 70 | 30 | 65 | 0.08 | 10 | — | — | — | 65 | 40 | 3 | 65 | 40 | 3 | 3 | 3 |
| Test A14 | 70 | 30 | 65 | 0.08 | 10 | — | — | — | 65 | 40 | 7 | 65 | 40 | 3 | 3 | 5 |
| Test A15 | 70 | 30 | 65 | 0.08 | 10 | 65 | 0.07 *1 | 2 | 65 | 40 | 3 | 25 | 40 | 3 | 2 | 2 |
| Test A16 | 70 | 30 | 65 | 0.08 | 10 | 65 | 0.07 *1 | 2 | 65 | 40 | 3 | 25 | — | 3 | 2 | 2 |
| Test A17 | 70 | 30 | 50 | 0.08 | 9 | 65 | 0.07 *1 | 2 | 65 | 40 | 3 | 65 | 40 | 3 | 3 | 4 |
| Test A18 | 90 | 10 | 65 | — | 18 | 65 | 0.07 *1 | 2 | 65 | 40 | 3 | 65 | 40 | 3 | 3 | 5 |
| Test A19 | 50 | 10 | 65 | 9.08 | 10 | 65 | 0.07 *1 | 2 | 65 | 40 | 3 | 65 | 40 | 3 | 3 | 5 |
| Test A20 | 30 | 10 | 50 | 0.08 | 9 | 65 | 0.07 *1 | 2 | 65 | 40 | 3 | 65 | 40 | 3 | 3 | 4 |
| Test A21 | 50 | 50 | 65 | — | 18 | 65 | 0.07 *1 | 2 | 65 | 40 | 3 | 65 | 40 | 3 | 3 | 5 |
| Test A22 | 50 | 50 | 65 | 0.08 | 10 | 65 | 0.07 *1 | 2 | 65 | 40 | 3 | 65 | 40 | 3 | 3 | 5 |
| Test A23 | 100 | 0 | 65 | 0.08 | 10 | 65 | 0.07 *1 | 2 | 65 | 40 | 3 | 65 | 40 | 3 | 3 | 5 |
| Test A24 | 0 | 100 | 65 | 0.08 | 10 | 65 | 0.07 *1 | 2 | 65 | 40 | 3 | 65 | 40 | 3 | 1 | 1 |
| Test A25 | — | — | — | — | — | 65 | 0.07 *1 | 2 | 65 | 40 | 10 | 65 | 40 | 3 | 3 | 4 |

Note that, in Table 1, "-" indicates that the step is not performed. Therefore, in Tests A3 and A5, the cleaning step is not performed. In addition, in the preliminary cleaning step of Tests A6 and A7 or the cleaning step of Tests A13 and A14, the decompression operation is not performed. In the rinsing step of Tests A5, A10, and A16 or the cleaning step of Test A11, an ultrasonic wave is not applied.

(Test A12)

The decompression operation was stopped before the cleaning agent LQ2 started boiling. At this time, the decompression amount ΔP2 from the atmospheric pressure is as shown in Table 1. The cleaning method of the support material was performed with respect to the three-dimensional modeled object X, as with Test A1, except for conditions shown in Table 1.

| Fatty Acid Ester | 50 weight % |
| Solid Paraffin (CAS No. 8002-74-2) | 50 weight % |

Then, the cleaning method of the support material was performed with respect to the three-dimensional modeled object X, as with Test A1, except for conditions shown in Table 1.

(Test A23)

The components of the used preliminary cleaning agent are as follows.

| Fatty Acid Ester | 100 weight% |

Then, the cleaning method of the support material was performed with respect to the three-dimensional modeled object X, as with Test A1, except for conditions shown in Table 1.

(Test A24)

The components of the used preliminary cleaning agent are as follows.

Solid Paraffin (CAS No. 8002-74-2) 100 weight % Then, the cleaning method of the support material was performed with respect to the three-dimensional modeled object X, as with Test A1, except for conditions shown in Table 1.

(Test A25)

The cleaning method of the support material was performed with respect to the three-dimensional modeled object X, as with Test A1, except that the cleaning step and the rinsing step were performed without performing the preliminary cleaning step and conditions shown in Table 1 were used.

The three-dimensional modeled object X (a model material) after Tests A1 to A25 was evaluated on the basis of the following criteria. Each evaluation result is shown in Table 1.

1. Cleaning Degree Evaluation (Surface)

The surface of the three-dimensional modeled object X (the model material) (excluding the linear through hole and the curved through hole) after Tests A1 to A25 was evaluated.

Evaluation criteria are as follows.

1: According to visual observation, most of the support material remained.

2: According to visual observation, a small amount of the support material remained.

3: According to visual observation, no support material remained.

2. Cleaning Degree Evaluation (Hole)

The three-dimensional modeled object X (the model material) after Tests A1 to A25 was evaluated.

Evaluation criteria are as follows.

1: According to visual observation, most of the support material remained.

2: According to visual observation, the support material still remained.

3: According to visual observation, a small amount of the support material remained.

4: The support material was not capable of being checked in visual observation, but when allowing a metal wire having approximately the same diameter as that of the hole to pass through the hole, the metal wire was lodged in the middle and was not capable of passing through the hole.

5: The support material was not capable of being checked in visual observation, and when allowing a metal wire having approximately the same diameter as that of the hole to pass through the hole, the metal wire was capable of passing through the hole without being lodged.

(Tests B1 to B25)

A cleaning agent containing the following components was used.

Component of Cleaning Agent:

| | |
|---|---|
| Water | 90 weight % |
| Triethanol Amine | 5 weight % |
| 2-Aminoethanol | 5 weight % |

Then, the cleaning method of the support material was performed with respect to the three-dimensional modeled object X, as with Test A1, except for conditions shown in Table 2.

TABLE 2

| | preliminary cleaning agent | | Preliminary Cleaning Step | | | Cleaning Step | | | | | | Rinsing Step | | | Cleaning Degree Evaluation | |
|---|---|---|---|---|---|---|---|---|---|---|---|---|---|---|---|---|
| | Fatty Acid Ester | Solid Paraffin | T1 | ΔP1 | S1 | T2A | ΔP2 (MPa) *1 boiled *2 unboiled | S2A | T2B | f2 | S2B | T3 | f3 | S3 | | |
| No. | (%) | (%) | (° C.) | (MPa) | (min) | (° C.) | | (min) | (° C.) | (KHz) | (min) | (° C.) | (KHz) | (min) | Surface | Hole |
| Test B1 | 70 | 30 | 70 | 0.08 | 9 | 65 | 0.07 *1 | 2 | 65 | 40 | 3 | 65 | 40 | 3 | 3 | 5 |
| Test B2 | 70 | 30 | 70 | 0.08 | 9 | 65 | 0.07 *1 | 2 | 65 | 40 | 3 | 25 | 40 | 3 | 2 | 2 |
| Test B3 | 70 | 30 | 65 | 0.08 | 9 | — | — | — | — | — | — | 65 | 40 | 3 | | 1 |
| Test B4 | 70 | 30 | 60 | 0.08 | 16 | 65 | 0.07 *1 | 2 | 65 | 40 | 3 | 65 | 40 | 3 | 3 | 5 |
| Test B5 | 70 | 30 | 65 | 0.08 | 9 | — | — | — | — | — | — | 65 | — | 3 | 1 | 1 |
| Test B6 | 70 | 30 | 65 | — | 20 | 65 | 0.07 *1 | 2 | 65 | 40 | 3 | 65 | 40 | 3 | 3 | 5 |
| Test B7 | 70 | 30 | 65 | — | 18 | 65 | 0.07 *1 | 2. | 65 | 40 | 3 | 65 | 40 | 3 | 3 | 5 |
| Test B8 | 70 | 30 | 65 | 0.08 | 10 | 65 | 0.07 *1 | 2 | 65 | 40 | 3 | 65 | 40 | 3 | 3 | 5 |
| Test B9 | 70 | 30 | 65 | 0.08 | 10 | 50 | 0.07 *1 | 2 | 65 | 40 | 3 | 65 | 40 | 3 | 3 | 5 |
| Test B10 | 70 | 30 | 65 | 0.08 | 10 | 65 | 0.07 *1 | 2 | 65 | 40 | 3 | 65 | — | 2 | 3 | 4 |
| Test B11 | 70 | 30 | 65 | 0.08 | 10 | 65 | 0.07 *1 | 2 | — | — | — | 65 | 40 | 3 | 3 | 4 |
| Test B12 | 70 | 30 | 65 | 0.08 | 10 | 65 | 0.03 *2 | 2 | 65 | 40 | 3 | 65 | 40 | 3 | 3 | 4 |
| Test B13 | 70 | 30 | 65 | 0.08 | 10 | — | — | — | 65 | 40 | 3 | 65 | 40 | 3 | 3 | 3 |
| Test B14 | 70 | 30 | 65 | 0.08 | 10 | — | — | — | 65 | 40 | 7 | 65 | 40 | 3 | 3 | 5 |
| Test B15 | 70 | 30 | 65 | 0.08 | 10 | 65 | 0.07 *1 | 2 | 65 | 40 | 2 | 25 | 40 | 3 | 2 | 2 |
| Test B16 | 70 | 30 | 65 | 0.08 | 10 | 65 | 0.07 *1 | 2 | 65 | 40 | 3 | 25 | — | 3 | 2 | 2 |
| Test B17 | 70 | 30 | 50 | 0.08 | 9 | 65 | 0.07 *1 | 2 | 65 | 40 | 3 | 65 | 40 | 3 | 3 | 4 |
| Test B18 | 90 | 10 | 65 | — | 18 | 65 | 0.07 *1 | 2 | 65 | 40 | 3 | 65 | 40 | 3 | 3 | 5 |
| Test B19 | 90 | 10 | 65 | 0.08 | 10 | 65 | 0.07 *1 | 2 | 65 | 40 | 3 | 65 | 40 | 3 | 3 | 5 |
| Test B20 | 90 | 10 | 50 | 0.08 | 9 | 65 | 0.07 *1 | 2 | 65 | 40 | 3 | 65 | 40 | 2 | 3 | 4 |
| Test B21 | 50 | 50 | 65 | — | 18 | 65 | 0.07 *1 | 2 | 65 | 40 | 3 | 65 | 40 | 3 | 3 | 5 |
| Test B22 | 50 | 50 | 65 | 0.08 | 10 | 65 | 0.07 *1 | 2 | 65 | 40 | 3 | 65 | 40 | 3 | 3 | 5 |

TABLE 2-continued

| No. | preliminary cleaning agent Fatty Acid Ester (%) | preliminary cleaning agent Solid Paraffin (%) | Preliminary Cleaning Step T1 (° C.) | Preliminary Cleaning Step ΔP1 (MPa) | Preliminary Cleaning Step S1 (min) | Cleaning Step T2A (° C.) | Cleaning Step ΔP2 (MPa) *1 boiled *2 unboiled | Cleaning Step S2A (min) | Cleaning Step T2B (° C.) | Cleaning Step f2 (KHz) | Cleaning Step S2B (min) | Rinsing Step T3 (° C.) | Rinsing Step f3 (KHz) | Rinsing Step S3 (min) | Cleaning Degree Evaluation Surface | Cleaning Degree Evaluation Hole |
|---|---|---|---|---|---|---|---|---|---|---|---|---|---|---|---|---|
| Test B23 | 100 | 0 | 65 | 0.08 | 10 | 65 | 0.07 *1 | 2 | 65 | 40 | 3 | 65 | 40 | 3 | 3 | 5 |
| Test B24 | 0 | 100 | 65 | 0.08 | 10 | 65 | 0.07 *1 | 2 | 65 | 40 | 3 | 65 | 40 | 3 | 1 | 1 |
| Test B25 | — | — | — | — | — | 65 | 0.07 *1 | 2 | 65 | 40 | 10 | 65 | 40 | 3 | 3 | 4 |

The three-dimensional modeled object X (the model material) after Tests B1 to B25 was evaluated on the basis of the above-mentioned criteria. Each evaluation result is shown in Table 2.

(Tests C1 to C25)

VisiJet M2R-CL (manufactured by 3D SYSTEMS JAPAN K.K.) was used as the model material MD.

Components of Model Material MD:

| | |
|---|---|
| 3-Hydroxy-2, 2-Dimethyl Propyl-3-Hydroxy-2, 2-Dimethyl Propionate Diacrylate (CAS No. 30145-51-8) | 20 to 40 weight % |
| Tricyclodecane Dimethanol Diacrylate (CAS No. 42594-17-2) | 20 to 30 weight % |
| Diphenyl (2,4,6-Trimethyl Benzoyl) Phosphine Oxide (CAS No. 75980-60-8) | 0.5 to 1.5 weight % |
| Urethane Acrylate Oligomer | 10 to 30 weight % |

Then, cleaning method of the support material was performed with respect to the three-dimensional modeled object X, as with Test A1, except for conditions shown in Table 3.

TABLE 3

| No. | preliminary cleaning agent Fatty Acid Ester (%) | preliminary cleaning agent Solid Paraffin (%) | Preliminary Cleaning Step T1 (° C.) | Preliminary Cleaning Step ΔP1 (MPa) | Preliminary Cleaning Step S1 (min) | Cleaning Step T2A (° C.) | Cleaning Step ΔP2 (MPa) *1 boiled *2 unboiled | Cleaning Step S2A (min) | Cleaning Step T2B (° C.) | Cleaning Step f2 (KHz) | Cleaning Step S2B (min) | Rinsing Step T3 (° C.) | Rinsing Step f3 (KHz) | Rinsing Step S3 (min) | Cleaning Degree Evaluation Surface | Cleaning Degree Evaluation Hole |
|---|---|---|---|---|---|---|---|---|---|---|---|---|---|---|---|---|
| Test C1 | 70 | 30 | 70 | 0.08 | 9 | 65 | 0.07 *1 | 2 | 65 | 40 | 3 | 65 | 40 | 3 | 3 | 5 |
| Test C2 | 70 | 30 | 70 | 0.08 | 9 | 65 | 0.07 *1 | 2 | 65 | 40 | 3 | 25 | 40 | 3 | 2 | 2 |
| Test C3 | 70 | 30 | 65 | 0.08 | 9 | — | — | — | — | — | — | 65 | 40 | 3 | 3 | 1 |
| Test C4 | 70 | 30 | 60 | 0.58 | 16 | 65 | 0.07 *1 | 2 | 65 | 40 | 3 | 65 | 40 | 3 | 3 | 5 |
| Test C5 | 70 | 39 | 65 | 0.08 | 9 | — | — | — | — | — | — | 65 | — | 3 | 3 | 1 |
| Test C6 | 70 | 30 | 65 | — | 20 | 65 | 0.07 *1 | 2 | 65 | 40 | 3 | 65 | 40 | 3 | 3 | 5 |
| Test C7 | 70 | 30 | 65 | — | 18 | 65 | 0.07 *1 | 2 | 65 | 40 | 3 | 65 | 40 | 3 | 3 | 5 |
| Test C8 | 70 | 30 | 65 | 0.08 | 10 | 65 | 0.07 *1 | 2 | 65 | 40 | 3 | 55 | 40 | 3 | 3 | 5 |
| Test C9 | 70 | 30 | 65 | 0.08 | 10 | 50 | 0.07 *1 | 2 | 65 | 40 | 3 | 55 | 40 | 3 | 3 | 5 |
| Test C10 | 70 | 30 | 65 | 0.08 | 10 | 65 | 0.07 *1 | 2 | 65 | 40 | 3 | 55 | — | 3 | 3 | 4 |
| Test C11 | 70 | 30 | 65 | 0.08 | 10 | 65 | 0.07 *1 | 2 | — | — | — | 65 | 40 | 3 | 3 | 4 |
| Test C12 | 70 | 30 | 65 | 0.08 | 10 | 65 | 0.03 *2 | 2 | 65 | 40 | 3 | 65 | 40 | 3 | 3 | 4 |
| Test C13 | 70 | 30 | 65 | 0.08 | 10 | — | — | — | 65 | 49 | 3 | 65 | 49 | 3 | 3 | 3 |
| Test C14 | 70 | 30 | 65 | 0.08 | 10 | — | — | — | 65 | 49 | 7 | 65 | 40 | 3 | 3 | 5 |
| Test C15 | 70 | 30 | 65 | 0.08 | 10 | 65 | 0.07 *1 | 2 | 65 | 49 | 3 | 25 | 40 | 3 | 2 | 2 |
| Test C16 | 70 | 30 | 65 | 0.08 | 10 | 65 | 0.07 *1 | 2 | 65 | 49 | 3 | 25 | — | 3 | 2 | 2 |
| Test C17 | 70 | 30 | 50 | 0.08 | 9 | 65 | 0.07 *1 | 2 | 65 | 40 | 3 | 65 | 40 | 3 | 3 | 4 |
| Test C18 | 90 | 10 | 65 | — | 18 | 65 | 0.07 *1 | 2 | 65 | 40 | 3 | 65 | 40 | 3 | 3 | 5 |
| Test C19 | 90 | 10 | 65 | 0.08 | 10 | 65 | 0.07 *1 | 2 | 65 | 40 | 3 | 65 | 40 | 3 | 3 | 5 |
| Test C20 | 90 | 10 | 50 | 0.08 | 9 | 65 | 0.07 *1 | 2 | 65 | 40 | 3 | 65 | 40 | 3 | 3 | 4 |
| Test C21 | 50 | 50 | 65 | — | 18 | 65 | 0.07 *1 | 2 | 65 | 40 | 3 | 65 | 40 | 3 | 3 | 5 |
| Test C22 | 50 | 50 | 65 | 0.08 | 10 | 65 | 0.07 *1 | 2 | 65 | 40 | 3 | 65 | 40 | 3 | 3 | 5 |
| Test C23 | 100 | 0 | 65 | 0.98 | 10 | 65 | 6.07 *1 | 2 | 65 | 40 | 3 | 65 | 40 | 3 | 3 | 5 |
| Test C24 | 0 | 100 | 65 | 0.08 | 10 | 65 | 0.07 *1 | 2 | 65 | 40 | 3 | 65 | 40 | 3 | 1 | 1 |
| Test C25 | — | — | — | — | — | 65 | 0.07 *1 | 2 | 65 | 40 | 19 | 65 | 40 | 3 | 3 | 4 |

The three-dimensional modeled object X (the model material) after Tests C1 to C25 was evaluated on the basis of the above-mentioned criteria. Each evaluation result is shown in Table 3.

The cleaning method of the support material of the related art is as follows. (3 to 4) Three-dimensional modeled objects X were placed on a net disposed in an oven, and heated for 1 hour in a temperature range of higher than or equal to the melting point of the support material and lower than the melting point of the model material. Accordingly, most of the support material is melted. Next, the (3 to 4) three-dimensional modeled objects X are cleaned for 30 minutes by using an ultrasonic cleaning machine. After that, the remaining support material is scraped off by being rubbed with a toothbrush using isopropyl alcohol (approximately 2 to 3 hours per one object). In the cleaning method of the support material of the related art, at least 120 to 140 minutes was required per one three-dimensional modeled object X. In addition, according to the criteria described above, in "1. Cleaning Degree Evaluation (Surface)", the cleaning degree was "1". In "2. Cleaning Degree Evaluation (Hole)", the cleaning degree was "1". According to the invention, since the support material can be removed within 30 minutes, a removing operation time can be shortened.

Note that, the present invention is not limited to the embodiment described above, and it is obvious that the invention can be variously changed within a range not departing from the gist of the invention.

Explanations of Letters or Numerals

2 CLEANING DEVICE
11 PRELIMINARY CLEANING TANK
11C COVER PLATE
11K ENGAGEMENT PORTION
12 CLEANING TANK
12C COVER PLATE
12K ENGAGEMENT PORTION
21 OUTER CONTAINER
21S COVER
30 TEMPERATURE ADJUSTMENT UNIT
31 TEMPERATURE SENSOR
32 HEATER
40 ULTRASONIC UNIT
41 CONTROL BOX
42 OSCILLATOR
43 CABLE
60 SEALING UNIT
70 PUMP
80 CONTROLLER
100 CLEANING METHOD OF HIGH-MOLECULAR COMPOUND
110 PRELIMINARY CLEANING STEP
120 CLEANING STEP
130 RINSING STEP

The invention claimed is:

1. A hydrophobic preliminary cleaning agent consisting essentially of:
a first compound; and
a second compound,
wherein the first compound is fatty acid ester, and the second compound is at least any one of solid paraffin, hydroxylated wax, and aliphatic alcohol and
wherein a melting point of the hydrophobic preliminary cleaning agent is greater than or equal to a room temperature and less than or equal to 55° C.

2. The hydrophobic preliminary cleaning agent according to claim 1, wherein the second compound is greater than or equal to 10 weight %, based on a total weight of the first compound and the second compound.

3. The hydrophobic preliminary cleaning agent according to claim 2, wherein the aliphatic alcohol has 1 to 24 carbon atoms.

4. A hydrophobic preliminary cleaning agent comprising:
a first compound; and
a second compound,
wherein the first compound is fatty acid ester, and the second compound is any one of solid paraffin, hydroxylated wax, and aliphatic alcohol having 1 to 24 carbon atoms,
wherein a melting point of the hydrophobic preliminary cleaning agent is greater than or equal to a room temperature and less than or equal to 55° C., and
wherein the second compound is greater than or equal to 10 weight %, based on a total weight of the first compound and the second compound.

5. The hydrophobic preliminary cleaning agent according to claim 4, wherein the aliphatic alcohol is stearyl alcohol.

6. The hydrophobic preliminary cleaning agent according to claim 1,
wherein the second compound is stearyl alcohol.

7. A hydrophobic preliminary cleaning agent consisting of:
a first compound; and
a second compound,
wherein the first compound is fatty acid ester, and the second compound is at least any one of solid paraffin, hydroxylated wax, and aliphatic alcohol, and
wherein a melting point of the hydrophobic preliminary cleaning agent is greater than or equal to a room temperature and less than or equal to 55° C.

8. The hydrophobic preliminary cleaning agent according to claim 7,
wherein the second compound is stearyl alcohol.

* * * * *